United States Patent [19]

Müller et al.

[11] Patent Number: 4,543,780

[45] Date of Patent: Oct. 1, 1985

[54] DRIVE AND MOUNTING FOR AN OPEN-END SPINNING UNIT

[75] Inventors: Alfred Müller, Lenzburg; Harry Seiffert, Baden, both of Switzerland

[73] Assignee: BBC Brown, Boveri & Company, Limited, Baden, Switzerland

[21] Appl. No.: 450,030

[22] Filed: Dec. 15, 1982

[30] Foreign Application Priority Data

Dec. 22, 1981 [CH] Switzerland ............... 8196/81

[51] Int. Cl.⁴ ............... D01H 7/882; D01H 1/244; D01H 7/12
[52] U.S. Cl. ............... 57/406; 57/100; 57/130; 57/407; 57/415; 384/119; 384/124; 384/230; 384/231
[58] Field of Search ............... 57/100, 130–135, 57/404, 406, 407, 411, 415; 384/119, 124, 125, 215, 230, 231, 235

[56] References Cited

U.S. PATENT DOCUMENTS

| | | | |
|---|---|---|---|
| 3,105,164 | 9/1963 | Favrot | 57/100 X |
| 3,241,304 | 3/1966 | Mattingly et al. | 57/100 X |
| 3,416,300 | 12/1968 | Schenkel | 57/100 X |
| 3,875,732 | 4/1975 | Ellingham | 57/406 |
| 3,918,248 | 11/1975 | Suzuki | 57/415 X |
| 3,924,398 | 12/1975 | Essen et al. | 57/406 X |
| 4,022,008 | 5/1977 | Pimiskern et al. | 57/134 X |
| 4,070,813 | 1/1978 | Quandt et al. | 57/100 X |
| 4,112,663 | 9/1978 | Chrtek et al. | 57/100 X |
| 4,242,858 | 1/1981 | Dschen | 57/100 X |
| 4,306,166 | 12/1981 | Quandt | 57/100 X |

FOREIGN PATENT DOCUMENTS 598503 4/1978 Switzerland .

Primary Examiner—John Petrakes
Attorney, Agent, or Firm—Oblon, Fisher, Spivak, McClelland & Maier

[57] ABSTRACT

In order to be able to achieve, in yarn manufacture, the very high speeds required by the textile industry in open-end spinning devices, for the purpose of increasing production, and in order to achieve high operating reliability and a long life of the spinning devices, the rotor which rotates at high speeds and is subject to a variable imbalance and which is guided in gas-dynamic radial plain bearings is guided in a bearing carrier which is elastically pivotable in relation to the rigid bearing journal. At the same time, the bearing journal is connected, but so as to be elastically pivotable, to the bearing carrier via a bearing-body joint. A first gas-dynamic radial plain bearing, which is located in the region in the center of gravity of the rotor, is arranged on the bearing carrier, and a second gas-dynamic radial bearing is arranged at the opposite end of the bearing carrier. An elastic support is provided in the region of the second gas-dynamic radial plain bearing for assisting the elastically pivotable mounting. As a result of this constructive measure, the inertia forces and gyroscopic moments applied by the rotor are decoupled from the radial plain bearings.

12 Claims, 4 Drawing Figures

DRIVE AND MOUNTING FOR AN OPEN-END SPINNING UNIT

BACKGROUND OF THE INVENTION

1. Field of the Invention

The invention relates to an open-end spinning device consisting of an electric motor of which the rotor together with the spinning container are fastened on a hollow shaft, this hollow shaft being mounted on a bearing journal.

2. Description of the Prior Art

A device of this type is known, for example, from Swiss patent specification No. 598,503.

The requirements demanded of textile machines working according to the open-end spinning process are essentially as follows:

1. a high production capacity per machine unit;
2. a long life;
3. short idle times;
4. long inspection intervals;
5. a low noise level; and
6. a high degree of flexibility for a wide yarn-count range.

However, these requirements can be met only with machine constructions which essentially allow fault-free spinning at very high speeds and rapid exchangeability of the spinning containers with different dimensions, whilst ensuring minimum idle times. The necessary robustness of the constructions and the necessary quiet running of the rotors at high speeds, which involve the mounting of the rotors, are important preconditions for this.

Swiss patent specification No. 598,503 describes a spinning unit of the type mentioned above. In this, the rotor shaft forms with the rotor of the electric motor, together with roller bearings, a constructional unit which is accommodated fixedly in the housing part of the machine by means of gluing and, if appropriate, by means of additional mechanical tongue-and-groove anchoring.

However, the use of roller bearings for high rotor speeds presents problems, since these can lead to losses due to friction which are converted into heat, which is transmitted to the rotor and the spinning container. Although the construction according to Swiss patent specification No. 598,503 provides for the exchangability of the rotor part in textile operation, this specification does not describe the method of putting this into effect. However, it would seem to involve a relatively high outlay in terms of work and time.

Furthermore, because of the spinning process, residues of fiber material remain adhering, in uneven distribution, in the spinning groove of the spinning container, and particles of dirt settle in the spinning groove. As a result, the mass of the spinning container, of the hollow shaft and of the rotor armature, which rotates at high speed, has its quiet running disturbed because of an undefined imbalance which is variable as a function of time both in amount and in direction. The wobbling movements of the rotor, which result from this, exert constraining forces on rigidly arranged radial bearings and have a destructive effect on bearing systems of this type.

SUMMARY OF THE INVENTION

Starting from the state of the art described above, the object on which the invention is based is to provide an open-end spinning device which works in an operationally reliable manner in a very high speed range, whilst the unbalanced rotating mass can rotate at any time, largely undisturbed, about its main axis of inertia.

To achieve this object, it is envisaged, according to the invention, that a bearing carrier be attached on the bearing journal and be connected to the bearing journal via a radially centering bearing-body joint, and that the bearing carrier be arranged so as to be pivotable elastically in relation to the bearing journal about the bearing-body joint. This construction has the following advantages:

As a result of the possibility of radial deflection in relation to the rigidly clamped bearing journal, the bearing carrier can follow the variations in the axis of rotation of the rotor in any operating state. As a result, the forces caused by the imbalance of the rotor and acting partially on the radial plain bearings are largely eliminated and premature wear or destruction of the bearings are prevented.

As a result of the radially centering elastic support provided by the bearing-body joint, the bearing carrier can be restored to an exact central arrangement in relation to the bearing journal.

The bearing-body joint is located approximately in the region of the center of gravity of the rotor. As a result of this, the components of all the forces applied by the rotor are combined at a fixed point, i.e., the center of gravity, and assisted by the elastic guidance of the rotor by the bearing body joint, no constraining forces can be exerted on the radial plain bearings. The rotor is therefore radially rigid at its center of gravity, but is guided elastically in the axial direction as a result of the restoring force of the bearing-body joint.

There is, in a radial groove, of the bearing journal opposite the end of the bearing journal adjacent the spinning container, an elastic support on which the bearing carrier is supported at its inner surface, with the result that the bearing carrier is guided so as to be elastically deflectable in relation to the bearing journal.

Since the bearing carrier is guided so as to be elastically pivotable at the center of rotation of the rotor, the inertia forces and gyroscopic moments applied by the rotor to the bearing carrier can affect the latter opposite the portion of the bearing carrier adjacent the spinning container as a result of a lever effect, and the advantage is that the bearing carrier is supported at these locations.

An elastic support can instead be provided in a radial groove in the bearing carrier opposite the end of the bearing carrier adjacent the spinning can, with the result that the bearing body is guided so as to be elastically pivotable in relation to the journal.

The electric motor is mounted by means of at least one vibration-damping element in a machine housing, in order to guide the vibrations, caused in the spinning container and/or in the radial bearings and transmitted to the rotor, via the bearing journal and the housing of the electric motor to the vibration-damping elements, where they are eliminated. The advantage is that the vibrations are guided over a precisely defined path to the vibration-damping elements.

The bearing-body joint is made hollow-cylindrical and consists of an elastic material, the elasticity of the bearing-body joint being determined both by the material and by its geometrical design and dimensions.

The bearing-body joint consists of a hollow-cylindrical body, in the interior of which is located a contact ring, the inner bore of which corresponds to the outer diameter of the bearing journal at the contact point, and formed parallel to the axis of the bearing-body joint are slits which extend virtually over the entire height of the cylindrical surface and at least partially into the contact ring, with the result that elastic lamellae are formed in the bearing-body joint.

The advantage of this feature is that the bearing-body joint produces the best possible elastic properties in the axial direction and in relation to pivoting movements, and that the high requirements as regards maintaining the elastic properties under continuous load are satisfied.

The bearing-body joint is connected firmly by means of its outer surface to the bearing carrier and by means of the surface of the contact ring to the bearing journal. This connection guarantees a high degree of safety of the mechanical fastening of the immovable machine parts under high bending and torsional stresses.

As a result of the above construction, a gap is formed between the elastic lamellae of the bearing-body joint and the bearing journal, which gap is capable of allowing the deflection movement of the bearing-body joint.

This construction allows the bearing carrier to tilt and pivot outwards radially in an elastic manner, unimpeded by the bearing journal.

A first gas-dynamic radial plain bearing is located on the bearing carrier in the region of the center of gravity of the rotor and a second gas-dynamic radial plain bearing is located opposite the end portion of the bearing carrier which is adjacent the spinning container, these bearings being connected to the bearing carrier.

The advantages are that it is possible to align the two working surfaces of the bearings exactly with one another, so that simple machining of the two working surfaces can be carried out in a chucking device, as well as that high accuracy can be achieved in the tolerances relating to the dimensions, shape and position, and so that no assembly errors and no oblique positions or canting of the working surfaces are possible.

The bearing-body joint consists of steel. Consequently, high elastic properties are coupled with The bearing carrier and the working surfaces of the bearing journal consist of hard materials or have surfaces which consist of hard materials or materials which are hardened. By means of these materials very good bearing sliding properties and a long life, coupled with the best possible emergency running properties of the bearings, can be achieved.

Both the elastic supports and the vibration-damping elastic element consist preferably of rubber. By means of this economical material, high damping properties under continuous load can be achieved.

In assembly, the bearing-body joint is first connected by means of its outer surface to the bearing carrier, then the flexible support is attached to the bearing journal, then the bearing carrier together with the bearing body joint are inserted firmly on the fastening part of the bearing journal, then the hollow shaft, together with the rotor and spinning container, are pushed into the free space betwen the bearing carrier and the stator, and then the open-end spinning motor is provided with elastic elements and positioned in the machine housing.

Alternatively, the flexible support is first inserted in the bearing carrier opposite its end portion adjacent the spinning container. Then, the bearing-body joint is connected by means of its outer surface to the bearing carrier, then the bearing carrier together with the bearing-body joint are inserted firmly on the fastening part of the bearing journal, then the hollow shaft, together with the rotor and spinning container, are pushed into the free space between the bearing carrier and the stator, and then the open-end spinning motor is provided with elastic elements and positioned in the machine housing.

As a result, assembly can be carried out in a simple way with a low outlay in terms of time and labor.

BRIEF DESCRIPTION OF THE EMBODIMENTS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE DRAWINGS

Figure 1:
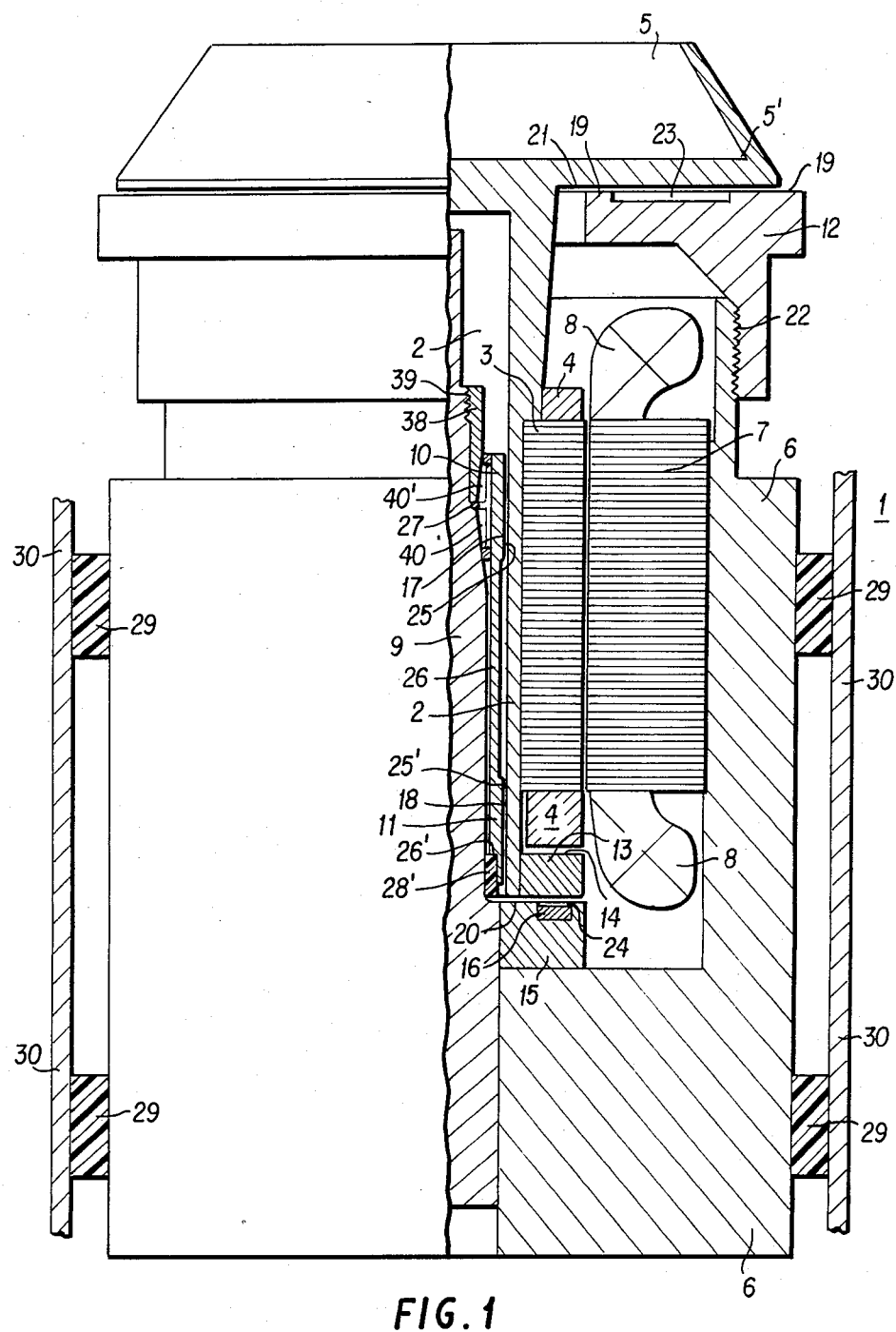
FIG. 1 shows a view of an open-end spinning motor, the right-hand half being shown as an axial section.

According to FIG. 1, the spinning device consists basically of an electric motor 1 with a stator 7, and a rotor 3 together with a spinining container 5. The laminated stator 7, including the winding, of which only the winding ends 8 are evident in the drawing, is arranged in the housing 6. Located in the solid lower part of the housing 6, in the center of the machine, is the bearing journal 9 which is fixed to the housing 6. The rotor 3 consists of a hollow shaft which is formed with or fixed to the spinning container 5. The spinning groove 5' is formed in the spinning container 5. The laminated rotor 3 and the rotor winding 4 are also arranged on the hollow shaft 2. Two gas-dynamic radial plain bearings 10, 11 and at least one gas-dynamic axial plain bearing 19 having a pocket 23 or axial plain bearing 20 having a pocket 24 respectively are provided for mounting the hollow shaft 2 rotating at a very high speed, including all the rotating parts 3, 4, 5.

The Forschungsvereinigung Verbrennungskraftmaschine e.V. published in No. R 343, 1976, a lecture by Professor J. Glienicke of the University of Karlsruhe, which was given in Wolfsburg on 9.21.1978 on the occasion of the Information Conference of the Forschungsvereinigung Verbrennungskraftmaschinen e.V., describes the theoretical and experimental analyses of the gas-dynamic bearings for small turbo-machines, on which the invention is based.

First radial bearing 10 is located in a portion of the same end as the spinning container on the bearing carrier 26, in the region of the center of gravity of the rotor. A second radial bearing 11 is likewise located on the bearing carrier 26 at the opposite end. The bearing carrier 26 is sleeve-shaped and surrounds the bearing journal 9 with play. At its end adjacent the spinning container, the bearing carrier 26 is elastically pivotally connected to the bearing journal 9 via a bearing-body joint 27.

An eleastic support 28' is provided, in a radial groove 26' opposite the end portion of the bearing carrier 26 adjacent the spinning container, with the result that the bearing carrier 26 is likewise guided so as to be elastically pivotable in relation to the bearing journal 9.

Figure 2:
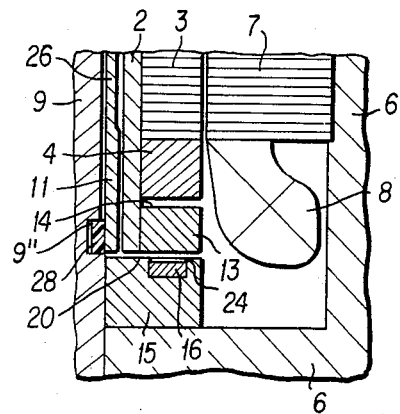
FIG. 2 is an axial sectional view according to FIG. 1, but in an alternative form.

FIG. 2 illustrates an axial section of an alternative embodiment in which the elastic support 28 is located in a radial groove 9″ of the bearing journal 9, with the result that the bearing carrier 26 is guided so as to be elastically deflectable in relation to the bearing journal 9.

In the embodiment according to FIG. 1, the bearing-body joint 27 is, on the one hand, connected firmly to the bearing journal 9 by the union nut 38 having a thread 39, and on the other hand there is a rigid connection between the bearing-body joint 27 and the bearing carrier 26. Between the bearing-body joint 27 and the bearing journal 9 or the union nut 38 there is a gap 40 which allows for the radial deflection of the bearing-body joint 27 relative to the bearing journal 9.

Figure 3:
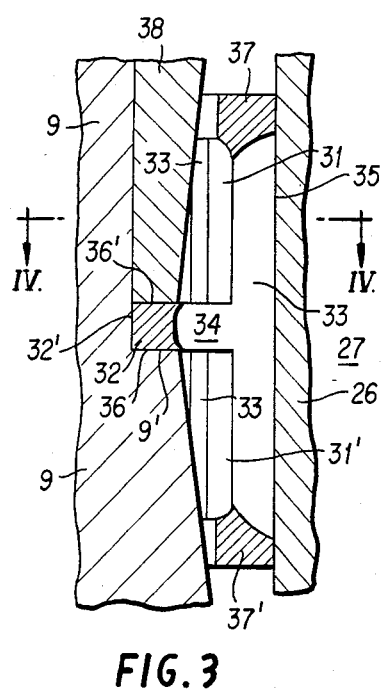
FIG. 3 is an axial, sectional view through the bearing-body joint, including the adjacent parts.
Figure 4:
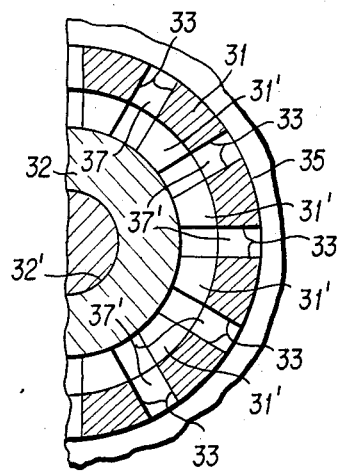
FIG. 4 is a radial sectional view through a bearing-body joint according to FIG. 3.

A clearer view of the bearing-body joint 2, on a larger scale, including its surrounding functional parts, may be seen in FIGS. 3 and 4.

In FIG. 1, a first axial bearing 19 having a pocket 23 is also formed in the end face of the bearing plate 12, which is fixed to the housing or connected to the housing part 6′ by means of a thread 22, and consists of a working surface and the axial-bearing pocket 23. A second axial bearing 20 having a pocket 24 is located in the annular widened portion 15 of the bearing journal 9 and consists of a working surface and the axial-bearing pocket 24. In the embodiment according to FIG. 1, two axial bearings 19 and 20 are illustrated. However, only one of these two is necessary for the functioning of the machine.

Since the rotor together with the spinning container 5 can be pushed into and out of the stator bore in a simple way from the spinning container side and is not mechanically locked, the positioning of the rotor in the stator assumes increased importance. The rotor is positioned exactly in every speed range by means of a permanent magnet 16. This magnet is located in the annular widened portion 15 of the bearing journal 9. The permanent magnet 16 located in the annular widened portion 15 exerts a magnetic pull on the opposite balancing ring 13 and presses the rotor by means of the lower surface 14 of the balancing ring 13 against the working surface 20 of the second axial bearing 20. In this way, the rotor together with the spinning container 5 is retained in a precisely defined position in the stator in every speed range.

The balancing ring 13, which is located at the end of the hollow shaft 2 facing away from the spinning container, serves, in addition the function of axial mounting of the rotor also for compensating for a possible slight imbalance of the rotor occurring at very high speeds.

It is evident in FIG. 1 that the electric motor 1 is retained in the supporting structure 30 by elastically vibration-damping elements 29.

FIG. 3 is an axial sectional view through the bearing-body joint 27 including the adjacent parts 9, 26, 38. The bearing-body joint 27 basically consists of a bush, with a hollow-cylindrical part 31, 33, 37, 37′ and formed unitarily with a contact ring 32, the contact ring 32 having an inner bore 32′ which corresponds to the outside diameter of the bearing journal 9 at that point. Arranged in the hollow-cylindrical parts 31, 33, 37, 37′ of the bearing-body joint 27 are slits 33, 34 which are distributed uniformly in an axis-parallel manner over the entire periphery and which extend into the contact ring 32. The slits in the hollow-cylindrical part 31, 33, 37, 37′ are denoted by the reference numeral 33 and those in the contact ring 32, transverse to the axial direction, are denoted by the reference numeral 34. By means of the slits 33, 34 there are formed both in the hollow-cylindrical part 31, 33, 37, 37′ and in contact ring 32 lamellae 31, 31′ which connect the contact ring 32 and the outer surface 35 of the bearing-body joint 27 as resilient elements. Only the axis-parallel lamellae 31 may be seen in FIG. 3. However, all the lamellae 31, 31′ can be seen clearly in FIG. 4. The lamellae 31 extend in an axis-parallel manner virtually over the entire height of the bearing-body joint 27 and terminate in annular end portions 37, 37′, whilst the lamellae 31′ extend into the contact ring 32 perpendicularly to the axis of the bearing-body joint and terminate in the contact ring 32 itself.

As is evident in FIG. 3, part of the bearing journal 9 forms a step, and this step is located at the inner bore 32′ of the contact ring 32, so that the bearing-body joint 27 is arranged centrally in relation to the bearing journal 9. The surface 36 of the contact ring 32 rests on the stepped fastening part 9′, of the bearing journal 9 and is connected to the fastening part 9′ by the union nut 38 pressing the surface 36′ of the contact ring 32. On the other hand, the bearing-body joint 27 is connected firmly at its outer surface 35 to the bearing carrier 26. The fixed connection between the bearing-body joint 27 and the bearing carrier 26 can be made, for example, by pressing the joint 27 in the carrier. However, the methods of connection betwen the bearing-body joint 27 and the bearing journal 9 or bearing carrier 26 are, of course, not restricted to the screw or press connection illustrated in the shown embodiment, but welding and/or soldering and/or gluing connections can also be used.

FIG. 4 shows a radial section through a bearing-body joint 27 including its surrounding parts, the bearing journal 9, the bearing carrier 26 and the union nut 38, reference being made especially to the one-piece design of the lamellae 31, 31′ which extend on the one hand parallel and on the other hand perpendicularly to the axial direction of the bearing-body joint 27. The best possible elastic properties are achieved by means of this exemplary embodiment of the lamellae 31, 31′.

The mode of operation of the mounting according to the invention for textile machines working according to the open-end spinning process is described in more detail below:

Even at low speed, the rotating mass of the spinning container 5, the hollow shaft 2 and the rotor armature 3, 4 has its quiet running disturbed by an undefined imbalance in the spinning container 5, the imbalance being variable both in amount and in direction. Up to a specific critical speed range, this disturbance of quiet running, which results in wobbling movements of the rotor will increase continuously and, after this critical speed has been reached, will decrease again up to a nominal speed range, but without disappearing completely. The hollow shaft 2 of the rotor which is mounted in a first radial plain bearing 10 in the region of the center of gravity of the rotor on the bearing carrier 26 and at the opposite end in a second radial plain bearing 11 likewise on the bearing carrier 26, can be viewed as a guided gyroscope, the unbalanced rotating mass of which can rotate at any time, largely undisturbed, about its main axis of inertia. In the kinematic guidance of the rotor according to the subject of the present invention, the constraining forces exerted on the bearings are eliminated because the inertia forces and gyroscopic moments exerted by the rotor are decoupled from the radial plain bearings 10, 11 by means of the carrier bearing joint 27. The resilient lamellae 31, 31' of the carrier bearing joint 27 make it possible, as a result of their radially deflectable and elastically restoring properties which coaxially guide the bearing carrier 26, together with the radial bearings 10, 11, and the hollow shaft 2 in every speed range, to follow the forces applied by the rotor and thus prevent constraining forces, which would lead to premature wear or to destruction, from being exerted on the bearings 10, 11. The flexible supports 28, 28', which can be located both on the bearing journal 9 and in the bearing carrier 26, serve to assist this kinematic guidance of the hollow shaft 2 free of constraint.

In the open-end spinning technology considered here, it is also necessary to allow for the fact that the bearing journal 9 guiding the hollow shaft 2 and supporting the bearing carrier 26 is connected firmly to the housing 6 of the electric motor 1 only on one side and that the bearing journal 9 is not fastened at the end adjacent the spinning container. As a result of this measure which is necessary for reasons of construction, additional instabilities arise in the guidance of the rotor and these overlay the above-mentioned applied inertia forces and gyroscopic moments. The vibrations caused in the spinning containers 5 and/or the radial plain bearings 10, 11 and transmitted to the rotor are guided via the bearing journal 9 and the housing 6 of the electric motor 1 to the vibration-damping elements 29 and are eliminated by these.

The gas-dynamic radial plain bearings 10, 11 and axial plain bearings 19, 23 and 20, 24 work, in conjunction with the elastically pivotable bearing carrier 26, as follows:

When the machine is at a standstill, the working surfaces 19, 21 of the first axial bearing 19, 23 and the working surfaces 14, 20 of the second axial bearing 20, 24 are in mutual contact. Likewise, when the machine is at a standstill, the working surfaces 17, 18 of the first radial bearing 10 and those of the second radial bearing 11 touch the opposite working surfaces 25, 25' of the bearing carrier 26. However, even at a low speed of the rotor, a build-up of pressure takes place both in the two axial bearings 19 and 20 and in the two radial bearings 10, 11, and a gap forms automatically, on the one hand, between the working surfaces of the first axial bearing 19, 23 and the working surfaces 14, 20 of the second axial bearing 20, 24 and, on the other hand, between the working surfaces 17, 25 of the first radial bearing 10 and the working surfaces 18, 25' of the second radial bearing 11.

Of course, the mounting of the hollow shaft 2, together with the rotating parts 3, 4, 5, is not restricted only to gas-dynamic radial plain bearings 10, 11 and axial plain bearings 19 and 20. In addition to these, gas-static, hydrodynamic and hydrostatic plain bearings and roller bearings of various tyupes can likewise be used within the scope of the present invention. The choice of mounting depends primarily on the rotor speed.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by letters patent is:

1. An open end spinning device comprising:
   an electric motor cylindrical housing open at a first end and closed at a second end:
   a laminated stator in said housing;
   a laminated rotor within said stator, said rotor including a hollow shaft and a rotor winding;
   an open ended, directly driven spinning container located on one end of said hollow shaft;
   radial bearing journal means fixed to said second end of said housing and extending into said hollow shaft for guiding the rotation of said rotor such that a hollow space is formed between said journal means and said hollow shaft;
   a radially centering bearing body joint fixed to said journal means;
   a sleeve-shaped bearing carrier fixed to said joint and mounted over said journal means via said joint so as to surround said journal means with play whereby said carrier is elastically pivotally connected to said journal means for damping dynamic imbalances of said rotor; and
   axial bearing means mounted in said housing for supporting said hollow shaft.

2. The device of claim 1 wherein said joint is positioned adjacent the center of gravity of said rotor.

3. The device of claim 1 including an annular radial groove in one of said journal means and said carrier at a position opposite said one end of said hollow shaft, and an elastic support in said groove and facing the other of said journal means and said carrier.

4. The device of claim 3 wherein said motor housing is mounted in a machine housing, said device including at least one vibration damping element supported between said motor housing and said machine housing, whereby vibrations of said rotor are damped.

5. The device of claim 4 wherein said elastic support and said at least one vibration damping element are formed of rubber.

6. The device of claim 1 wherein said motor housing is mounted in a machine housing, said device including at least one vibration damping element supported between said motor housing and said machine housing, whereby vibrations of said rotor are damped.

7. The device of claim 1 wherein said joint is in the form of a hollow cylinder formed of elastic material.

8. The device of claim 7 wherein said joint further includes:
   a ring of elastic material fixed to the interior of said cylinder, the inner diameter of said ring corresponding to the outer diameter of said journal means at the position of said ring; and
   a circumferentially spaced plurality of axial slits through said cylinder and partially into said ring, said slits extending over almost the entire height of said cylinder and defining elastic lamellae therebetween.

9. The device of claim 8 including means for fixing said ring to said journal means, and means for fixing the radially outer surface of said cylinder to said carrier, whereby a gap is formed between said lamellae and said journal means so as to allow deflection of said joint.

10. The device of claim 1 wherein said joint is formed of steel.

11. A method of assembling an open end spinning device including an electric motor housing including a bearing journal, a stator, a rotor including a hollow shaft and a spinning container, a bearing body joint and a bearing carrier, said method comprising the steps of:
- fixing an otuer surface of said joint to said carrier;
- fixing a flexible support to said journal;
- inserting said joint and carrier on a fastening portion of said journal;
- inserting said rotor in said housing with said journal, said carrier and said joint extending within said hollow shaft such that said carrier is elastically pivotally connected to said journal for damping dynamic imbalances of said rotor; and
- mounting said motor housing in a machine housing with elastic elements positioned between said housings.

12. A method of assembling an open end spinning device including an electric motor housing including a bearing journal, a stator, a rotor including a hollow shaft and a spinning container, a bearing body joint and a bearing carrier, said method comprising the steps of:
- fixing a flexible support to said carrier;
- fixing an outer surface of said joint to said carrier;
- inserting said joint and carrier on a fastening portion of said journal;
- inserting said rotor in said housing with said journal, said carrier and said joint extending within said hollow shaft such that said carrier is elastically pivotally connected to said journal for damping dynamic imbalances of said rotor; and
- mounting said motor housing in a machine housing with elastic elements positioned between said housings.

* * * * *